Sept. 21, 1954
L. O. TOSI
2,689,414
MECHANICAL DRY FLY DRIER
Filed July 24, 1953
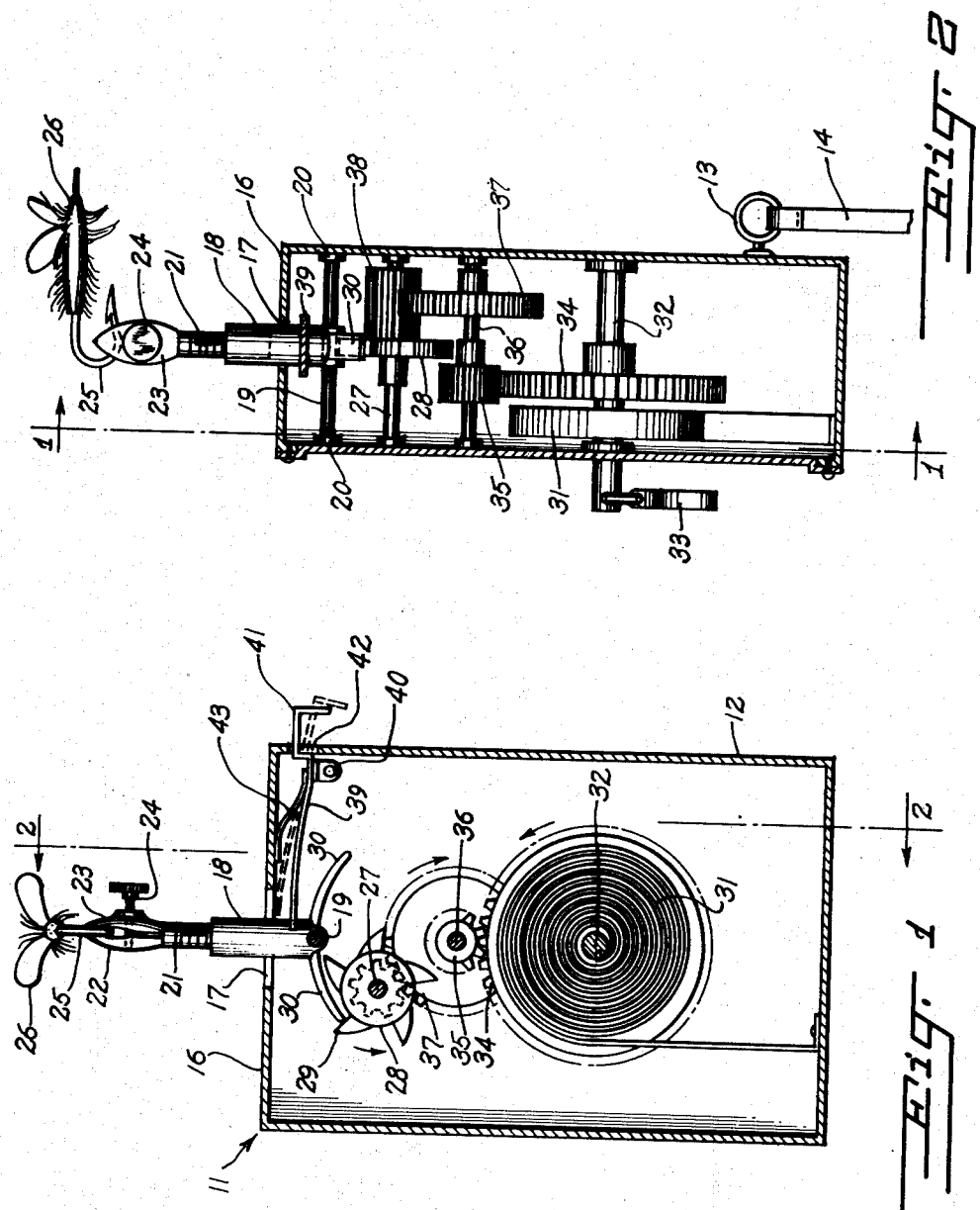
INVENTOR.
Louie O. Tosi
BY
McMorrow, Berman + Davidson
ATTORNEYS Patented Sept. 21, 1954

2,689,414

UNITED STATES PATENT OFFICE 2,689,414

MECHANICAL DRY FLY DRIER

Louie O. Tosi, Weed, Calif.

Application July 24, 1953, Serial No. 370,203

2 Claims. (Cl. 34—164)

This invention relates to fishermen's equipment, and more particularly to a drying device for drying flies.

The main object of the invention is to provide a novel and improved device for drying lures, said device being simple in construction, being easy to operate, and enabling a wet lure to be shaken dry in a rapid and effective manner.

A further object of the invention is to provide an improved mechanical drier for fishing lures, said drier being inexpensive to fabricate, being rugged in construction, and being compact in size.

Further objects and advantages of the invention will become apparent from the following description and claims, and from the accompanying drawings, wherein:

Figure 1 is a vertical cross sectional view taken through an improved lure drying device constructed in accordance with the present invention, said view being taken on the line 1—1 of Figure 2.

Figure 2 is a vertical transverse cross sectional view taken through the fly drying device of the present invention on the line 2—2 of Figure 1.

Referring to the drawings, the lure drying device is designated generally at 11 and comprises a rectangular housing 12 provided with the connecting eye member 13, whereby the lure drying device may be suspended from a strap 14 so that it may be readily carried by the fisherman. The top wall 16 of the housing 12 is provided with a central slot 17 through which projects an internally threaded sleeve member 18, said sleeve member being secured at its bottom end to a transverse shaft member 19 rotatably mounted in suitable bearing elements 20, 20 on the front and rear walls of the housing, as shown in Figure 2. Threadedly engaged in the top portion of the sleeve 18 is the shank 21 provided with the opposing resilient clamping arms 22 and 23, a clamping screw 24 extending through the arm 23 and being threadedly engaged with the arm 22, whereby tightening of the screw 24 causes the arms 22 and 23 to be drawn together. As shown in Figures 1 and 2, the hook portion 25 of a lure 26 may be engaged between the free end portions of the resilient arms 22 and 23 and may be clampingly secured between the arms 22 and 23 by tightening the screw 24. In this manner the lure 26 may be secured to the pivoted sleeve member 18 in a position extending perpendicular to the plane of rotation of said sleeve member.

Designated at 27 is a transverse shaft rotatably mounted in the housing 12 below the shaft 19. Secured on the shaft 27 is the ratchet wheel 28 having the ratchet teeth 29. Secured to the lower end of the sleeve member 18 in the plane of the ratchet wheel 28 are the arcuate arms 30, 30, said arms being engageable with the toothed periphery of the ratchet wheel 28 in the manner illustrated in Figure 1. As shown in Figure 1, counter-clockwise rotation of the ratchet wheel 28 causes the teeth 29 thereof to successively engage the bottom surface of an arm 30, causing the sleeve member 18 to be rotated in a clockwise direction, as viewed in Figure 1, after which another tooth 29 of the ratchet wheel 28 engages the other arm 30, causing the sleeve member 18 to be driven counter-clockwise. Thus, when the ratchet wheel 28 rotates continuously in a counter-clockwise direction, as viewed in Figure 1, the sleeve member 18 will be oscillated on its pivotal axis at a rate depending upon the speed of rotation of the shaft 27 of the ratchet wheel.

The shaft 27 is driven by a conventional clockwork mechanism including the clock spring 31 which is mounted on a shaft 32 and which may be wound up by means of a handle 33 secured to the external portion of the shaft 32, as shown in Figure 2. The shaft 32 has secured thereon the large gear 34 which meshes with a small gear 35 mounted on a rotatable shaft 36 the shaft 36 being rotatably mounted transversely between the front and rear walls of the housing 12. Secured on the shaft 36 is a large gear 37 which meshes with a smaller gear 38 secured on the shaft 27. Thus, when the spring 31 unwinds, the shaft 27 is driven at a rapid rate and oscillates the sleeve member 18 in the manner above described.

Designated at 39 is a catch arm which is pivoted at 40 in the upper corner portion of the housing 12, the arm 39 being provided with the externally projecting handle portion 41 which projects outwardly through a slot 42 formed in the side wall of housing 12. The arm 39 is biased downwardly toward a position wherein it lockingly engages the sleeve member 18 by a leaf spring 43 secured at one end to the top wall 16 of housing 12 and having its opposite end portion engaging the top surface of the arm 39. As shown in Figure 1, the arm 39 normally engages the sleeve member 18 and prevents oscillation of said sleeve member. When the arm 39 is rotated clockwise, as viewed in Figure 1, as by pressing downwardly on the handle element 41, the sleeve member 18 is released and will be oscillated by the action of the ratchet wheel 28 on the arms 30, 30, as the spring 31 unwinds, as above described.

Therefore, to use the device, the lure 26 is secured between the resilient clamping arms 22, 23 by tightening the screw 24, in the manner above described, with the lure arranged in a plane normal to the plane of oscillation of sleeve member 18. The clock spring 31 may then be wound up by means of the handle 33, as above described. The handle member 41 is then pressed downwardly to release the sleeve member 18 whereby the spring unwinds and vigorously oscillates the sleeve member 18, causing the lure 26 to be shaken laterally in opposite directions, whereby the moisture is shaken off the lure. Ordinarily, only a very short period of vibration of the lure is required to dry the lure sufficiently for use.

While a specific embodiment of an improved fly drying device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fly drying device comprising a support, a member pivoted to said support, means on said member for clampingly engaging a fly, a plurality of projections on said member, a ratchet wheel rotatably mounted on said support and having teeth intermittently engageable with said projections to rock said member responsive to rotation of said ratchet wheel, spring-driven manually windable driving means mounted on said support and being drivingly coupled to said ratchet wheel, and a manually releasable catch lever pivoted on said support and being at times lockingly engageable with said member to prevent said member from rocking.

2. A fly drying device comprising a housing, a member pivotally mounted in and projecting through a wall of said housing, means on said member for clampingly engaging a fly, a plurality of projections on said member, a ratchet wheel rotatably mounted in said housing and having teeth intermittently engageable with said projections to rock said member responsive to rotation of said ratchet wheel, spring-driven manually windable driving means mounted in said housing and being drivingly coupled to said ratchet wheel, a manually releasable catch lever pivoted in and projecting through a wall of said housing and being at times lockingly engageable with said member to prevent said member from rocking, and spring means mounted in said housing and engaging said catch lever and biasing said lever toward locking engagement with said member.

References Cited in the file of this patent

UNITED STATES PATENTS

| Number | Name | Date |
| --- | --- | --- |
| 1,107,028 | Busch | Aug. 11, 1914 |
| 1,702,857 | Arndt | Feb. 19, 1929 |
| 1,799,833 | Swanson | Apr. 7, 1931 |
| 2,617,133 | Cocchiola | Nov. 11, 1952 |